Figure 4:
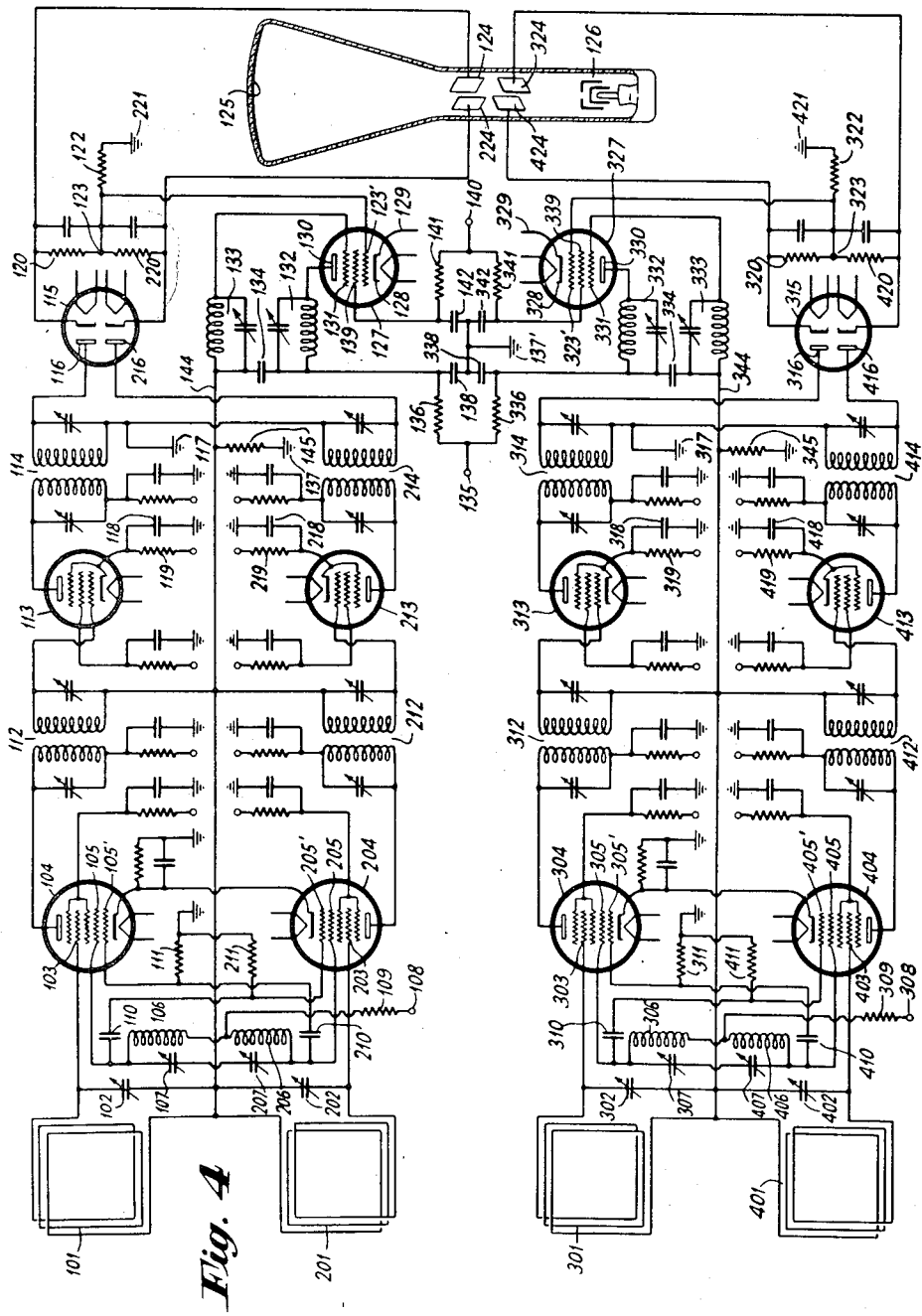

July 14, 1942.    R. H. GEORGE    2,289,493
ELECTRONIC SYSTEM
Original Filed March 30, 1938    3 Sheets-Sheet 1
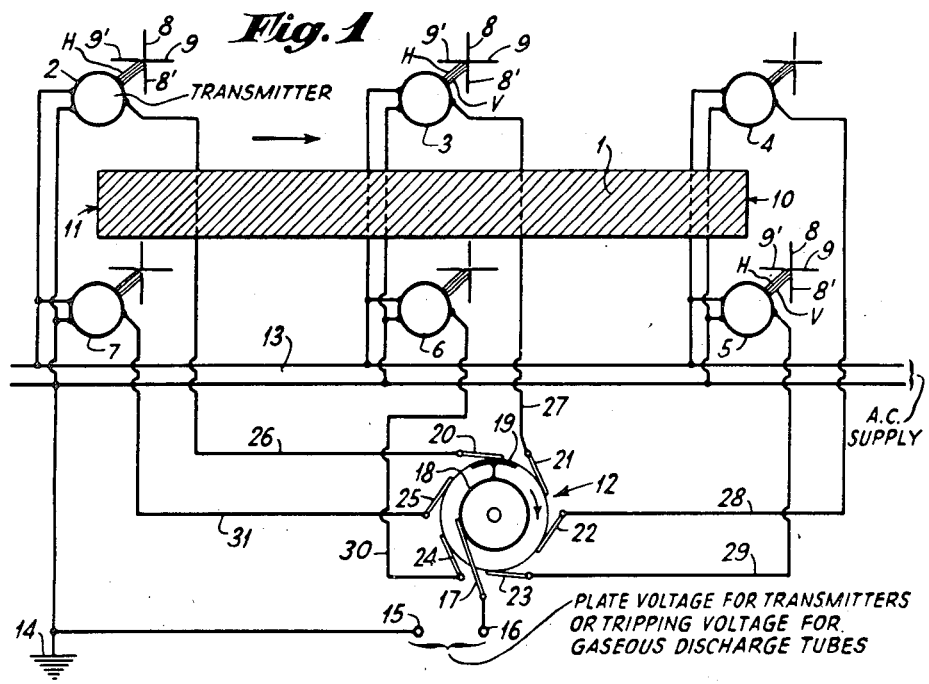
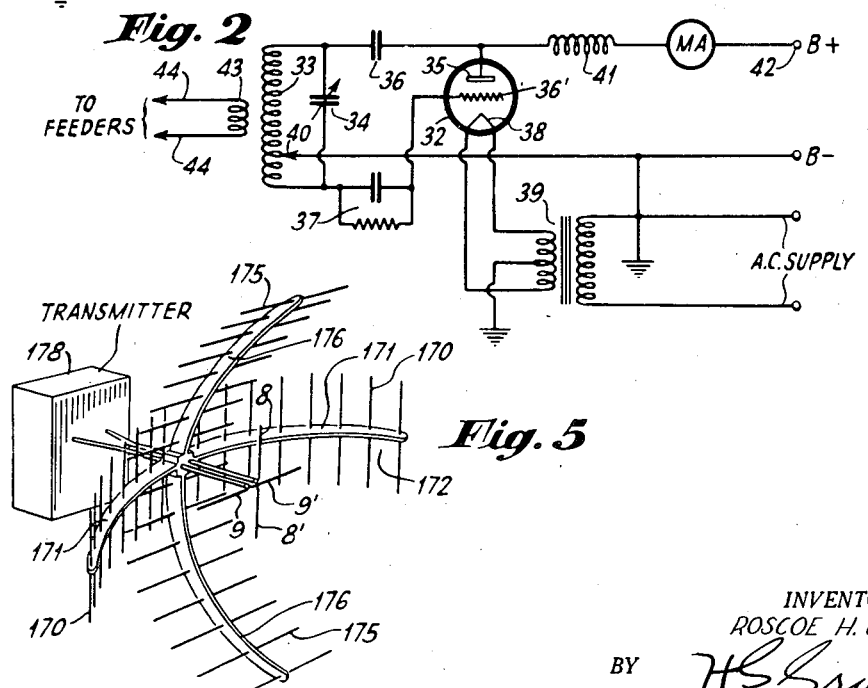
INVENTOR.
ROSCOE H. GEORGE
BY
ATTORNEY

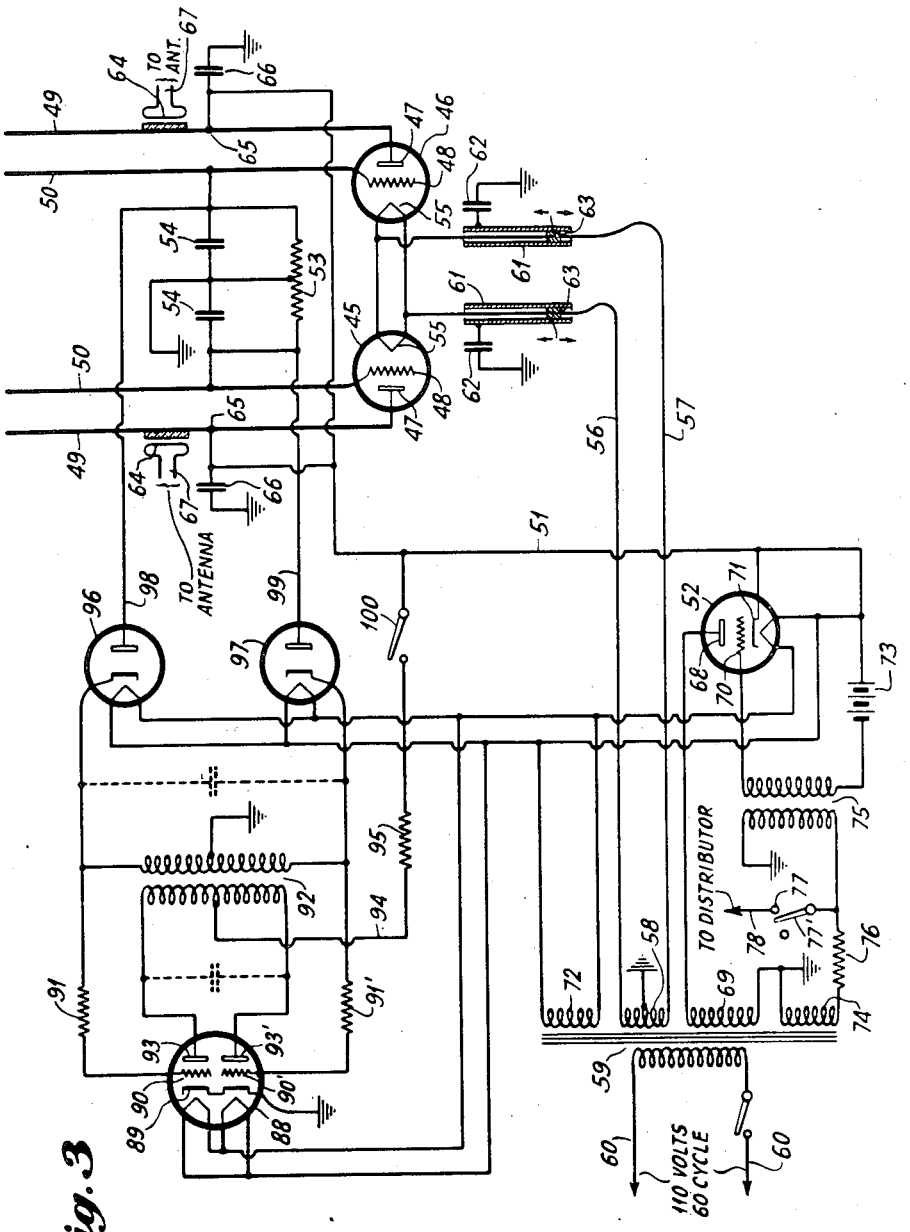

Patented July 14, 1942

2,289,493

UNITED STATES PATENT OFFICE 2,289,493

ELECTRONIC SYSTEM

Roscoe H. George, West Lafayette, Ind., assignor to Radio Corporation of America, a corporation of Delaware Original application March 30, 1938, Serial No. 198,888, now Patent No. 2,216,707, dated October 1, 1940. Divided and this application July 16, 1940, Serial No. 345,770

4 Claims. (Cl. 250—20)

This application is a divisional of my Patent No. 2,216,707, issued October 1, 1940, entitled "Electronic indicating system."

The present invention relates to a system for transmitting image signals or characteristic indications of particular conditions obtaining at a significant area being approached. In its more specific form the invention provides a system for transmitting indications such, for example, as boundary lines, predetermined points or selected areas, or the like on a significant surface which is being approached by an airplane, for example, or by a ship. Such a significant surface or area then may represent an airport or some selected runway determined by wind conditions, for example, upon which the airplane is to be landed or an area over which the airplane should fly in approaching an airport or the significant area may be a harbor into which a ship is to be guided through conditions of heavy fog or storm, for example. Since problems of airplane and ship navigation are generally similar, and the former the more difficult, particular reference is made herein to the application of this invention to airplane guiding although it is to be appreciated that there is no restriction of scope intended by such reference.

The problem of transmitting actual images of landing fields and surrounding objects to pilots attempting to land aircraft on fog or storm obscured fields or to guide ships into harbors under similar adverse conditions is greatly complicated by the necessity that the view transmitted must be that which the pilot would see if the airport or harbor were visible to the eye. Hence, if such forms of transmission are to be useful to any great degree, it is almost essential that the exact bearing of the airplane relative to the landing field or airport shall be known. During periods of fog and storm, as well as during periods of darkness and heavy weather when the visibility is very limited, the airplane pilot in approaching the airport or the pilot guiding the ship is frequently unable to see the landing field or to sense the direction of the runways thereon until the aircraft is almost immediately upon the landing field or the ship is outside the desired channel insofar as actual geographical separation is concerned, or until the aircraft is almost upon the airport insofar as the altitude of flying is concerned.

Any method of transmitting the correct view of the field or airport to a pilot by television would require not only a television receiver in the airplane where such receiver would usually embody for good reception with adequate detail a substantial number of parts and a considerable amount of space, as well as expense of installation, but which would require also ground transmitting apparatus for accurately determining the exact position and direction of flight of the plane at all times, together with apparatus for rapidly selecting the correct image to be transmitted. It is, of course, readily realized that systems of television of such a nature would be reasonably certain to make safer airplane flights in bad weather, in darkness, and at times landing fields are obscured by conditions of weather and the like, but it also is easily realized that as a general proposition, such forms of apparatus are somewhat complicated for practical use unless the reproduced images which the pilot observes are so lacking any substantial detail that little advantage from a practical viewpoint can be obtained.

Therefore, the present invention provides ways and means by which the indications of markers or special identification points or relative locations of significant areas on the landing field are made to appear on a viewing screen or target, preferably located in the pilot's cabin of the airplane, in correct perspective as points of light which are caused to appear before the pilot in substantially the same perspective as he would actually see such points or areas were he able actually to view them.

A system of this nature preferably comprises on the aircraft two pairs of direction finding loops or directional receiving antennae and associated circuits, that is, one for the horizontal direction and one for the vertical direction, with suitable amplifiers connected to form a part of the receiving circuits. These receiving circuits are suitably arranged for feeding the output energy into bridge circuits from which potentials are developed to control the reproduction of the produced points of light. At the same time, through a suitable system of balancing the bridge circuit may be caused to operate and control a sensitive automatic volume control to establish the desired level of response of the system.

In the presently proposed apparatus the light point reproduction is initiated as the production of light spots on the luminescent screen, target, or endwall of a cathode ray tube. Accordingly, the potentials developed at suitably selected points on the bridge circuit are applied to control directly the electrical potentials applied to the electron beam deflecting plates of an electrostatically deflected beam within a cathode ray tube or the developed potentials are caused to control in suitable manner the current flowing through deflecting coils so as to deflect the electron beam in the electromagnetic type of beam deflection system as used with present day cathode ray tubes. According to either form of system the electron beam developed within the cathode ray tube is caused to impinge at different points on the luminescent screen or target in accordance with the magnitude of the potentials applied to the deflecting plate electrodes or in accordance with the magnitude of the currents caused to flow through the electron beam deflecting coils associated with the cathode ray tube.

The circuits which are to accomplish this result are so arranged that they cause such deflection of the cathode ray beam that it indicates on the viewing screen of the cathode ray tube the amount of deviation of the aircraft from a position at which the aircraft should be moving or approaching if flying directly toward the significant points or markers from which the radiant energy transmission originated. Thus, the transmitting areas or markers are indicated on the observation target or screen as several selected points on the significant surface being approached by the aircraft. The receiving circuits are provided with suitable automatic volume control arrangements, as above suggested, to make the receiver apparatus sensitive substantially only to the angle of deviation of the receiver relative to the transmitter rather than to the actual signal intensity being received upon the directionally responsive circuits. As a general rule, and especially where a saving in weight is important, an electrostatic deflection control of the cathode ray in the light point producing means is usually desirable, since the weight of magnetic yokes and some additional tubes usually required in the electromagnetic systems are avoided.

Insofar as the transmission end of the system is concerned, a suitable number of radio transmitters are set up to mark the airport and the runways or the area over which the airplane is to be guided. During transmission periods each transmitter is properly tuned to the same frequency and arranged to be operated sequentially and successively for short time periods, for example, time periods of the order of $1/120$ of a second so that with a system from which six separate transmitters send out signalling indications, each transmitter representing the location of one of the suggested six significant markers on the significant surface will be operated once each 20th of a second. Assuming the transmission is thus carried on and the receiver is operated as above described the positions of impact on the screen or target area by the cathode ray beam developed within the receiving tube which is located within the field of view of the airplane pilot will indicate as a series of points the several transmitter locations. Thus, the position of the airplane with respect to each of the several significant markers of the airport or of the area over which the airplane is to be guided during the period of operation of the transmission is readily discernible.

As a result of the rapid repetitions of a series of points indicating the location of each marker on the significant surface, the pilot would observe on the viewing screen or target area of the cathode ray tube a bright spot for each marker on the airport or the area over which the plane is to travel. At all times the position of these several bright spots on the viewing screen of the cathode ray tube is caused to appear in correct perspective since each reading or light spot production point is corrected at least twenty times per second so that the observed effect corresponds to that view which the pilot would actually see were he able to look through a hole in the instrument panel at lights located at positions on the airport or significant surface corresponding to the location of the several radio transmitter positions. The airplane pilot then by watching his meters registering altitude while making his observations of location relative to the significant area is easily able to make a safe landing in fog in the same manner as he would be able to land were he able to see marking lights on the airport and runway in true visual perspective as he approached the field.

Further, as a part of the present invention provision is made to transmit from the airport at each of the selected significant points a horizontally polarized wave for the horizontal direction finding apparatus and a vertically polarized wave for the vertical direction finding apparatus in accordance with the suggestion above that the receiver equipment on the airplane comprise two direction finding circuits, that is, one for horizontal and one for vertical direction finding. Suitable provision is made at the airport from which the transmission to the airplane take place for switching in sequence between each of the several transmitters for this purpose, and, accordingly, during the period of persistence of vision, herein assumed as one-twentieth of a second for illustration, each transmitter is energized at least once.

A further provision of the present invention is that of developing a system for guiding an aircraft or the like so that the aircraft is able to follow a series of marking points or locations so as to fly along a predetermined course with the greatest possible security irrespective of weather conditions. For example, if the airplane is to be guided through a mountainous region and is required to fly through certain passes in the mountains, it is possible by the arrangement of several transmitters which radiate energy according to a predetermined sequence to observe on the indicating tube of the receiver equipment located on the airplane point representations allocated in space in the same relative location as the actual transmitters. Under such conditions, for instance, if the location point reproducing device, such as the cathode ray tube, is so divided or marked that a dividing line is drawn through its center in a horizotnal direction, this dividing line will represent to the pilot the horizon. In order that the elevation of the airplane may be maintained the pilot will so guide the ship that all of the several points to be indicated along a straight line path appear on the observation screen at locations slightly below the center dividing line. In order that the pilot may know that he is following exactly the proper course of the several points reproduced to represent the relative location of the transmitting points, he will guide the plane so that all of the several points also appear approximately in the center of the tube as regards a vertical line through the center.

In some instances, it is desirable also, in flying through mountainous regions, to provide for transmissions from bounding locations marked at either side of the several transmitters located according to the direction of flight and in addition thereto. These transmitters also are arranged to radiate energy at the same frequency as those to mark the line of flight but in order that the point designations produced on the reproducing device to represent the course followed may not, by chance, be mistaken for actually the guiding points, it is usually desirable that the repetition frequency of these limited locations be at substantially reduced rate in order that the point designations produced on the viewing device may occur more infrequently and the pilot may be able to sense at once that the infrequent designations are pictorial indications showing the limits within which he must maintain his course. In such a case, it is, of course, easy to control the line of flight by the line of flight indicating radiations and the auxiliary guide points may even be represented upon the screen as points of greater elevation than that at which it is necessary to maintain flight and thus the auxiliary points may appear on the screen either above, below or at the same level as the line of flight control indications but spaced laterally apart therefrom.

In accordance with the above mentioned general characteristics of the invention to be herein described, it is an object of the present invention to provide a simplified form of transmitting and receiving equipment which shall be capable of functioning to guide and direct airplanes to airports or ships into harbors in such a manner that the airplane may approach the landing field or airport or the ship enter a harbor in total darkness (or "blind" so-to-speak) or in bad weather conditions with substantially the same degree of safety as if the landing port or field or the harbor were completely visible to the pilot.

A further object of the invention to be herein described is to provide a means for guiding aircraft, ships or the like which is relatively simple in its construction and arrangement and to provide a system wherein the efficient results of visual transmission of a significant surface is accomplished through the mere transmission of certain selected significant points on that surface.

A further object of the invention is to provide ways and means for guiding aircraft and the like wherein the receiver equipment provides for the viewing of certain selected significant points of a significant surface in true perspective in order that the pilot may be able to guide his craft toward the significant surface under all conditions of weather, darkness and the like.

Still a further object of the invention herein set forth is that of providing a system of indication either for portraying a significant area or for indicating a course of travel or the like which will produce a series of point indications which appear in substantially actual perspective and free to move over the indicating device so as to represent effectively relative locations. In such event the central portion of the indicating device, as regards the vertical line therethrough, will represent that area which is directly in the line of travel and the center as regards the horizontal line therethrough will indicate substantially the level at which flight is being maintained. Other systems heretofore proposed have suggested that several point indications on a viewing tube, such as a cathode ray tube, may be produced where the point indications appear along a radius and the separation between various points indicates the relative distance from the area or markers. Such systems, however, do not portray the true perspective of the indicated markers and, in most instances, with such systems of the prior art in order to obtain indication of both horizontal and vertical positions with respect to the significant points require two separating indicating devices in contrast to the single indicating device herein proposed.

An additional object is to provide a transmission system which will provide visible guiding indications and yet be so simple in arrangement as to be operated without any substantial degree of attention. It is a still further object of the invention to provide receiving equipment which is so light in weight, due to simplified circuits and a limited number of constituent parts, as to enable it to be used on substantially all aircraft without fear of adding sufficent weight to require either a reduction in the so-called "pay-load" or to require any substantial reduction in fuel supply carried by reason of added weight due to auxiliary equipment.

As a still further object of the invention provisions may be made for installations of the transmitter arrangements in such manner that the airplane may be guided over treacherous country, such as through a pass between mountains, by means of the indications observed, although there is no attempt actually to land the airplane on the significant surface or area from which the guiding indications are radiated. This form also applies particularly in guiding ships through narrow and treacherous channels or harbor entrances. Hence, the invention has wide application to directional course guiding even though there is no attempt, as in aerial navigation, to land an airplane within the area from which the radiations originate. Thus, the transmitter arrangements to be described herein may be used, where desired, as replacements for the usual beam markers along airways.

Still other objects and advantages of the invention will immediately become apparent and at once suggest themselves to those skilled in the art by reading the specification to which it is directed and by the accompanying drawings wherein:

Fig. 1 represents schematically one of the several runways at the landing field and also represents in a diagrammatic manner the location of the several transmitters at selected significant points on a significant area which are so arranged that each transmitter may transmit both horizontally and vertically polarized waves of radiant energy; and, in addition, the figure also indicates schematically one arrangement for switching sequentially between the several transmitters so that each may send radiations of energy at desired time periods;

Fig. 2 is a schematic representation of an arrangement of oscillator for use with the transmitter at any or all of the several transmitting points shown by Fig. 1;

Fig. 3 diagrammatically represents one of a number of different alternative transmitter arrangements which may be used for the system shown by Fig. 1;

Fig. 4 is a circuit diagram of one of several forms of receiver arrangements, it being understood that the receiver of Fig. 4 since being of the heterodyne type is preferably used with the longer wavelength transmitted from the several transmitters of Fig. 1 and particularly that form of transmitter shown by Fig. 3; it being herein understood however that all of the wavelengths to which the system herein described is primary, although not necessarily, adapted are substantially within the range known in the art as "micro-waves" and thus of the order of one meter or less in length; and, Fig. 5 is a schematic representation to indicate schematically the general arrangement of the antenna and reflector systems for radiating both vertically and horizontally polarized waves at each transmitting point and, at the same time, the arrangement of this form of the radiating means for practicing the invention is particularly characterized by its properties of directional and polarized transmission or radiation.

Referring now to the drawings and first to Fig. 1 thereof, the runway 1 is conventionally represented as one of the several runways located at the landing field or other significant area (not herein shown complete for simplification) toward which the airplane is approaching. Positioned symmetrically with respect to this runway are a number of transmitter stations 2, 3, 4, 5, 6, and 7. Each of the transmitters is arranged to transmit a vertically polarized wave by means of the vertical dipole antennae 8, 8' as well as a horizontally polarized wave by means of the horizontal dipole antennae 9, 9' to which energy is supplied from the several transmitters by way of the transmission lines H and V which are conventionally indicated but which in practice are each shielded within suitable shielding means such as copper tubes.

Where directional transmission is desired, these several transmitting antennae may be provided with suitable reflectors, preferably arranged behind the antenna and projecting forward thereof in the direction of wave propagation according to a parabolic arrangement. Reference may be made to Fig. 5, later to be referred to more specifically, for an illustration and explanation of one suitable manner of arranging the dipole radiators 8, 8' or 9, 9' or both with reflectors, but for the sake of simplicity this complete arrangement is not indicated by Fig. 1 although it is to be understood that the arrangement of Fig. 5 may, and preferably should, be incorporated with the system shown by Fig. 1.

If, now, an airplane is approaching the landing field and, for example, the wind direction across the landing field surface is that shown by the arrow immediately above the runway 1, it will be desirable for the airplane to land on the runway 1 in a direction so as to come into the wind. Accordingly, it will be assumed herein that the airplane is approaching the landing field from a direction to the right of the transmitters 4 and 5 in order that it may land into the wind and first approach the end 10 of the runway and move toward the end 11 when stopping. Under such conditions it is desirable, in accordance with the above brief outline of conditions of operation, that the several transmitters 2 through 7 be controlled in sequence so that energy is radiated sequentially from each. In accordance with whatever energy is radiated, point representations to indicate the relative location of the several transmitters 2 through 7 with respect to the runway 1 may be obtained on the viewed target or screen 125 of the cathode ray tube or its equivalent (see Fig. 4) located within the view of the pilot. Further, as was above set forth as one of the principles of this invention, such viewing of the several points from which transmission takes place is intended to be in substantially the same perspective as these points would be seen by the pilot could he actually view the landing field.

The voltage supplied by way of conductors 98 and 99 from the diodes 96 and 97 to the oscillators 45 and 46 respectively serves to add to the bias applied to the control electrodes 48 of the last named oscillators and accordingly the applied potentials thus adding to the bias already supplied by the self-bias arrangement comprising the grid leak and condenser combination 53, 54 which bias these tubes for alternate half cycles of the frequency developed by the oscillator 88 negative to cut-off, in which event plate current ceases to flow through the oscillators 45 and 46 during the periods when current flows through the half-wave rectifiers 96 and 97 respectively. Where no modulation of the oscillators 45 and 46 is desired the switch 100 may be opened in order that the oscillator tube 88 shall never receive plate voltage and hence shall remain inoperative at all times during opened condition of the switch 100.

Inasmuch as the present invention is concerned primarily with the development of an automatic volume control potential in the receiving apparatus, the transmitting apparatus shown in Figures 1, 2, 3 and 5 is not herein described in detail since an adequate description of these figures is to be found in the above referred to Patent No. 2,216,707. From the description to be found in the specification of that patent, it can be seen that the ground or transmitting apparatus consists essentially of boundary and runway markers in the form of small radio transmitters arranged to be operated one at a time in rapid succession and preferably all transmitters operate on the same frequency. This is especially desirable in order to simplify the receiving equipment which, as above mentioned, is located on the airplane approaching the landing field or being guided over certain territory where no landing is desired or, for instance, upon the boats entering into the harbors.

Making further reference now to the receiver equipment which is to be located upon the airplane, that equipment preferably consists essentially of two pairs of loop antenna such as is used with the homing indicator or directional aerials. In addition, and in combination with the receiver equipment, there are provided special automatic volume control amplifiers which are arranged to feed into bridge circuits for obtaining so-called plus and minus readings when the airplane is not flying directly toward the operating transmitter. With this arrangement one of the pairs of loops and its associated amplifier would show horizontal deviation while the other of the pair of loops and the associated amplifier would show vertical deviation. If now the horizontal deviation potential is applied to the horizontal deflecting plate electrodes of a cathode ray tube in which the deflected cathode ray beam is to be deflected electrostatically and the vertical deviation potential is applied to the vertical pair of deflecting plate electrodes of the same tube, then it is apparent that the point of impact of the deflected cathode ray upon the target or luminescent screen would be a spot on that target or screen corresponding to the position of the operating transmitter with respect to the airplane. If the amplifiers of the receiver and the receiving loops are sensitive only to angle and not to changes in signal intensity, the cathode ray beam itself being practically free of inertia can register rapidly the readings from each of the transmitters as they operate in rapid succession. If now each of the transmitters is operated once every 20th of a second, this being assumed to be a frequency higher than the required frequency to maintain persistence of vision, and if it be assumed that the target or luminescent screen has a reasonably long time delay characteristic, then points of light resulting from the impact of the electron beam upon the screen or target of the cathode ray tube will appear. The pilot is then able to observe spots of light located in the same relative positions as the transmitters at the landing field would appear were he able to look through the instrument panel at lights located in the same relative positions as the transmitters.

Also, it will be appreciated that with the several transmitters at the landing field or over areas where the plane is to be guided and where each transmitter is arranged to transmit energy once each 20th of a second or so, it is apparent that the readings will produce luminous spots observable on the target area of the cathode ray receiver tube and that these visual spots and the locations thereof upon the target area will be corrected each 20th of a second as the airplane approaches the landing field. Thus, the produced luminous spots actually move across the target or screen area of the viewing tube in their true perspective.

With these thoughts in mind, reference may now be made to Fig. 4 of the drawings which shows by way of example one suitable form of receiver arrangement wherein two loops are indicated by way of example for receiving the transmitted horizontally polarized waves and two similar loops are utilized for receiving the transmitted vertically polarized waves. Since the circuits connected for receiving the horizontally and vertically polarized waves are essentially similar in all respects, reference for descriptive purposes will herein be made to one only (for example, the horizontal) of the two separate receiving channels but it will be understood that reference numerals, each increased by 200, identify corresponding parts of the receiver for receiving the vertically polarized waves.

In this receiver shown by Fig. 4 the loops 101 and 201 are arranged to receive the transmitted horizontally polarized waves and these loops may be orientated in known manner. Usually, when the loops are properly orientated with respect to the ship or airplane they are fixed in position and only the orientation of the ship or airplane with respect to the transmitters affects the indications on the cathode ray tube. The loops 101 and 201 are suitably tuned by means of the variable condensers 102, 202, and are caused to supply the received energy to the No. 4 grid 103, 203 of the modulated oscillators 104, 204, which are also known in the art as pentagrid converters. The oscillators 104, 204 are connected as push-pull oscillators with the No. 2 grids 105, 205, serving as the plate electrodes and the No. 1 grid 105', 205' serving as the control electrodes. Connected with the No. 2 grid 105, 205 which is to serve as the plate electrode of the oscillator is the usual form of tank circuit comprising the inductance and capacity elements 106 and 107, as well as 206 and 207 respectively. Suitable voltages for energizing the No. 2 grids 105 and 205 which are to serve as the plate or anode electrodes of the oscillator portions of each of the tubes 104 and 204 are supplied by way of the connection to the terminal points 108 through the resistor 109 which connects intermediate the two inductors 106 and 206. The coupling between the tank circuits 106, 107 and 206, 207, to the No. 1 grids of the oscillators 104 and 204 is provided by way of the blocking or coupling condenser 110 and 210, which with the usual resistors 111, 211 connected to ground, provide a self-biasing arrangement for the oscillators.

The resultant oscillations developed in that portion of the oscillator modulator 104, 204 between the cathodes and the No. 2 grids 105, 205, as well as the inner grid, are then modulated by the incoming signals supplied to the No. 4 grids 103 and 203 from the properly orientated loops 101, 201, and are then fed as intermediate frequencies through the transformer couplings 112, 212 to the intermediate frequency amplifiers 113 and 213, as indicated.

The modulated oscillators 104 and 204 are preferably the super control type mixer tubes and it is recommended that a tube operating in this circuit with characteristics closely analogous to those of a variable mu type tube be used, and such tubes as those known in the art as the 6A7 or 6A8, or the equivalent type tube having similar characteristics, have proven satisfactory.

The intermediate frequency amplifiers 113, 213, are preferably of the type tubes known in the art as the type 58 or the 6K7 although, of course, other tubes may be used where desired. Amplified intermediate frequency oscillations appearing in the output circuit of the tubes 113 and 213 are fed by way of the coupling transformer 114 and 214 to the double diode rectifier 115 for example, a tube of the general type known as the 6H6 and applied between the anode electrodes 116 and 216 thereof and ground at 117. While not previously mentioned herein it should be noted that in the tubes 113 and 213 the suppressor grid is connected to cathode in known manner. The tubes 113 and 213 also have, preferably, a self-biasing cathode arrangement provided by way of the resistor elements 119 and 219 across which are connected the capacity elements 118 and 218 which serve for smoothing out of the peaks which would otherwise be reduced. A suitable filter combination comprising the parallel resistor and condenser combinations, as shown, are connected with the anode and screen grid electrode of each of these tubes as well as upon the tubes 104 and 204.

From the above it can be seen that the double diode tube 115 is energized under normal conditions with signal control energy derived from the signals received upon either of the loops 101 or 201, which is determinable in accordance with the orientation of the loops and with the direction of the transmission or, as above explained, when the loops are fixed after proper orientation the orientation of the airplane or ship with respect to the transmitters is established. The output energy from the double diode 115 which flows through the resistors 120 and 220 to ground at 221 via the common resistor 122 connected to the junction point of the output resistors 120, 220 should be constant and thus the potential at the junction point 123 of the output resistors for signals received by the loops 101 and 201, will be a predetermined value above ground 221 measured in accordance with the drop taking place through the resistor 122. Thus, there is formed by means of the combination of the several resistors 120, 220 and 122 a bridge arrangement so that in accordance with variances of current flowing through resistors 120 and 220 the potential at the point 123 will shift to varying values above that of the grounded end of resistor 122. Such potential is determined in accordance with the signal strength received upon the receiving loops.

It can also be appreciated that with the output of each portion of the double diode 115 connected to opposite deflecting electrodes or plates 124 and 224, which are assumed to constitute the upper deflecting plate pair, of the cathode ray tube (conventionally indicated) that the electron beam passing from the electron gun structure 126 toward the target or screen 125 and passing between these plates during its travel will be deflected from its normal path in accordance with the difference in voltages between the outer ends of resistors 120 and 220 and ground 221 which are applied to each plate 124 and 224 of the deflecting plate pair. In this way the resultant cathode ray spot indication produced upon the luminescent screen or target 125 of the cathode ray tube as a result of the cathode ray beam being projected from the electron gun 126 toward the target or screen 125 will be shifted laterally on the target to represent changes in the point of origin of the signals transmitted from the transmitter stations of Fig. 1 relative to the receiving point.

Similarly, the lower deflecting plate pair 324 and 424 will provide for vertical shifting of the spot position in a similar manner under the control of the signals received upon the loops 301 and 401.

In this way a bi-directional trace is produced upon the viewing screen or target 125 of the cathode ray receiver tube by the impacting cathode ray beam or there is produced upon the screen of the cathode ray receiver tube distinct points or spots of light to represent the relative locations of the several transmitters at the transmitting station.

Since it is desirable to provide automatic volume control which will be effective both upon the modulated oscillator or mixer tubes 104 and 204 as well as upon the intermediate frequency amplifiers 113 and 213 the potential at the point 123 relative to ground 221 at any instant is applied to the control electrode 123' of an automatic volume control tube 127. The automatic volume control tube 127 normally has its cathode biased to a value substantially that corresponding to the normal drop taking place across the resistor 122 by suitable bias connected to the conductor or lead 129 which makes connection with the bias source.

The automatic volume control tube 127 is also connected as an oscillator with the plate or anode electrode 130 and the No. 3 grid 131 serving together with the cathode as the three electrode elements of the oscillator portion. According to this connection and arrangements the anode or plate element 130 is connected to one terminal of the tank circuit 132 which comprises the usual inductance and capacity elements and the No. 3 grid 131 is connected to one end of a similar tank circuit 133 also comprising inductance and capacity elements. The tank circuit 133 is coupled to the tank circuit 132 inductively and also by way of the blocking condenser 134. An additional purpose of the condenser 134 will be hereinafter explained more fully.

Suitable operating potentials for the tube 127 are provided by connecting a suitable source of anode supply at the terminal point 135 and feeding this supply through the resistor 136 to the anode 130. All high frequencies may be by-passed to ground 137' around the anode supply by way of the condenser 138. Similarly, suitable operating potentials for the No. 2 grid 139, serving also substantially as a screen grid, are supplied from the terminal point 140 through the resistor 141. Similarly, high frequencies are by-passed to ground 137 by way of the condenser 142.

In the arrangement herein disclosed it will be seen that by biasing the cathode 128 to a potential corresponding to the normal potential obtained at the point 123 the automatic volume control tube 127 is made sensitive to changes in the current flowing through the resistors 120 and/or 220 tending to change the potential at the point 123 relative to ground 221. The oscillator portion of the automatic volume control tube 127 is, as will be observed, an over-excited oscillator and, accordingly, it is possible in this arrangement to obtain grid rectification. Furthermore, it will be apparent that the main load on the oscillator is in the tank circuit 133 connected with the tube grid element 131. Accordingly, there is connected to the tank circuit 133 an additional conductor 144 which connects back to bias the No. 3 grids 103, 203 of the modulated oscillator arrangement 104 and 204, as well as to apply bias to the inner grid of the intermediate frequency amplifiers 133 and 213.

It will be noted in the arrangement shown that a resistor 145 connected between this conductor 144 and ground 137. This resistor 145 serves to provide a leak connection for the automatic volume control and it is preferably of a relatively high value, for example, of the order of 500,000 ohms. As is now evident from the connections shown the condenser 134 connected between the tank circuits 132 and 133 serves as a blocking condenser for coupling between the two tank circuits and, in addition, provides for filtering as well. It is preferably of a relatively small value for exampe of the order of 0.002 microfarad in order to follow changes rapidly.

If now it is desired to obtain, for example, a more or less relative indication of the actual distance between the point of reception and the point of transmission there may be connected in the lead 144 and/or 344 between the upper end of the leak resistors 145 and/or 345 and the point of connection of the conductors 144 and/or 344 to the tank circuits 133 and/or 333 a damped milliammeter, although this has not been shown specifically by the drawings and is not in any way essential to the invention. The purpose of the bias provided on the cathode of the automatic volume control tube 127 is such that normally this tube is biased to a cut-off valve for low values of current flowing through the resistor 122 and then as the current increases through resistor 122 there will be applied to the control grid 131' of the automatic volume control tube 127 a potential increasing in the positive sense which will serve to cause the tube 127 to draw plate current. Consequently, there will appear and pass beyond the No. 2 grid 139 toward the plate or anode electrode 130 an increasing flow of electrons. With the arrangement disclosed the No. 2 grid 139 serves as a virtual cathode for the oscillator portion of the tube and the increased electron flow will make the oscillator portion of the tube oscillate still more violently. Accordingly, and from what has been stated above, it will be apparent that whenever the automatic volume control tube 127 commences to function, a very slight change in the potential of the control grid 123' relative to the cathode 128 will produce a greatly magnified change in the potential appearing at the point where conductor 144 connects with the end of the tank circuit 133. In this way the changed potential appearing between the tank circuit 133 and the capacity 134 is transferred to act as a biasing potential applied to the modulated oscillators 103 and 203 as well as upon the intermediate frequency amplifiers 113 and 213. Hence, the effectiveness of the automatic volume control tube 127 is immediately noted in the intermediate frequency amplifiers 113 and 213 with a result that the current output transferred to the double diode 115 is controlled in an extremely sensitive manner and the potential effective at the point 123 relative to ground is maintained substantially without fluctuation. Nevertheless, the potential effective upon the opposite deflecting plate electrodes 124 and 224 is variable in accordance with the relative strength of the signals received in the loops 101 and 201.

It will be obvious to those skilled in the art that in the use of ultra-high frequency carriers it may be desirable to modulate the carrier, for example, by a system of the general type disclosed by Fig. 3, or by an analogous form of the device, at some frequency to which transformers 112 and 114, as well as 212 and 214 and their counterparts for the assumed channels are responsive. In such a case the modulated oscillator tubes 104 and 204 and the intermediate frequency amplifiers 113 and 213 would be replaced respectively by a detector and one or more stages of amplification as becomes necessary. Then, the output from the last stage of amplification (the several stages of amplification being considered equivalent to that shown by the intermediate frequency amplifiers 113 and 213) will be supplied to the double diode 115, as shown. Also, under such conditions, where the modulated oscillators 104 and 204 are replaced by a detector and the intermediate frequency amplifiers 113 and 214 are each replaced by one or more stages of amplification it is, of course, apparent that it is usually desirable then to apply the output of the automatic volume control tube 127 (connected to respond to signal changes as in Fig. 4) only to the amplifier tubes. Such automatic volume control action may then serve as a bias, preferably on the first stage of the multi-stage amplifier which would replace the intermediate frequency amplifiers 113 and 213. The other connections under such conditions may be maintained without any substantial alterations from those shown by Fig. 4.

Referring now to Fig. 5, there is illustrated one of several suitable means by which the dipoles conventionally represented in Fig. 1 by the numerals 8, 8' and 9, 9' for transmitting the vertically and the horizontally polarized waves may be supported. It has been known in the art and shown, for example, in the book "Short Wave Wireless Communication," by Ladner and Stoner, published in 1936 by John Wiley & Son, Inc., New York, that the dipole may be positioned within a parabolic reflector and reference may be made to page 420 of the aforesaid publication on this point. According to the arrangement preferred for use with this invention, the reflecting rods 170 for directing the vertically polarized wave may be positioned within a supporting framework 171, which is usually an insulator and for which wood has been found to be quite satisfactory. The vertical dipole 8, 8' is positioned at a point very close to the focus of the parabola or slightly nearer the reflecting rods 170 than the true focus point. In the preferred embodiment each of the reflecting rods 170 is substantially one-half wavelength long so that the portion of the reflecting rod above and below the insulator support member 171 is substantially one-quarter wavelength. The lateral separation between the several reflecting rods (indicated as the space 172) is not at all critical although a one-eighth wavelength separation has been found in practice to be satisfactory. However, a one-quarter wavelength separation of the reflecting rods may be used where desired.

The reflecting rods 175 for reflecting and directing the horizontally polarized wave are positioned substantially similar to the vertical reflectors and the vertical dipole except, of course, that the horizontal reflectors are oriented 90 degrees with respect to the vertical reflectors. The supporting insulating frame 176 for the horizontal reflectors is preferably formed integrally with supporting frame 171 for the vertical reflectors, although each supporting frame is turned 90 degrees with respect to the other.

The entire transmitter assembly, in view of its compactness and limited number of parts as illustrated by way of assembly in two of its preferred forms by Figs. 2 and 3, may be carried within a small container 178. By the characteristics of the container each transmitter accordingly may be suitably shielded with respect to each other transmitter. The several sections or parts of the transmitter are shielded against each other within the container. The entire assembly is then preferably mounted upon a support so as to be tilted, together with the radiating dipoles, at a slight angle with respect to the earth's surface.

In instances where it is possible to derive more power from the transmitter than is considered desirable with the arrangement herein shown, unless the arrangement be overloaded excessively, it is possible to radiate the horizontally polarized and the vertically polarized energy in two directions, that is, forward and backward of the radiating elements. In this event the reflectors as herein described and shown more particularly by Fig. 5 become non-essential to the usefulness of this invention and accordingly in order to provide directivity of transmission it is usually then desirable to provide, instead of the reflectors, suitable director rods positioned in front and in back of the radiating dipoles. Such director rods are also known in the art as the "Yagi directors" and are disclosed on page 422 of the publication to which reference was above made. Further, it is also contemplated as being within the scope of the present invention to utilize a combination of the reflectors and the director rods where a more directive transmission is desired.

It should also be understood that with the present invention it is not always necessary to use two pairs of loops in receiving but instead one pair of loops may be arranged to provide directional indications in one plane and a pair of dipoles or quarter-wave antennas for indications in the perpendicular plane. In such a case it, of course, naturally follows that a single dipole only is used at each point 2 through 7 of the transmitter, with the choice between a horizontal and vertical radiating dipole being determined in accordance with the choice made at the receiver for the use of loops to select either horizontal or vertical indications.

While the invention herein set forth has been described in some of its preferred embodiments it is, of course, apparent that many changes and modifications of that disclosure may be made without departing from the spirit or the scope of the invention and accordingly it is believed that such changes and modifications may be made provided they follow fairly within the scope of the claims hereinafter appended.

Having described my invention, what I claim is:

1. In a signal receiver, means for receiving signal energy, thermionic amplifying means for amplifying the received signal energy, means for detecting the amplified signal energy, means for obtaining from the detected signals a voltage representing the signal level at which said signals are received, a multi-electrode thermionic tube having a cathode, an anode and a plurality of control electrodes, an oscillatory circuit comprising inductance and capacity elements connected between the anode and cathode of said multi-electrode tube, a second oscillatory circuit comprising inductance and capacity elements connected between one control electrode and the cathode of said multi-electrode tube, said oscillatory circuits being inductively coupled one with the other, and a blocking condenser connected between the oscillatory circuits, said oscillatory circuits being adapted to develop oscillations of a predetermined frequency, means for applying the developed voltage representing the signal level of received signals between another control electrode and the cathode of said multi-electrode tube for modulating the developed oscillations, means for rectifying the modulated developed oscillations, and means for biasing the signal amplifying means under the control of the rectified modulated oscillations.

2. An automatic volume control for an amplifying system comprising a plurality of amplifying channels for amplifying simultaneously received signal energy of like character but of varying signal strength, a load circuit connected across the output of each of the amplifying channels, a portion of the load circuit for the amplifying channels being common to both channels, a multi-electrode electron tube, means including predetermined electrodes of said electron tube to develop oscillations of a predetermined frequency, means including a control electrode of said electron tube to modulate the intensity of the developed oscillations in accordance with the energy present in the common load circuit of the amplifying channels, means including a filter to produce a direct current potential in accordance with the intensity of the oscillations, and means for utilizing the produced direct current potential to control the amplifying factor of each of said amplifying channels.

3. An automatic volume control for an amplifying system comprising a signal amplifying channel including at least one thermionic tube for amplifying received modulated radio frequency signal energy, means to demodulate the amplified signal energy, a multi-electrode electron tube, means including predetermined electrodes thereof to develop oscillations of a predetermined frequency, a load circuit connected to the output of said demodulating means across which a signal voltage is developed, means to modulate the intensity of the said developed oscillations in accordance with the intensity of the developed signal voltage, means to rectify and filter the intensity modulated oscillations to produce a voltage variation in accordance with the intensity of the oscillations, and means to control the amplification of said signal amplifying channel in accordance with the intensity of the produced voltage variation.

4. In a signal receiving system, means for receiving modulated radio frequency signal energy, thermionic amplifying means for amplifying the received signal energy, means for rectifying the amplified signal energy, a load circuit for said rectifying means across which a signal voltage is developed, a multi-electrode thermionic tube, an oscillatory circuit connected between predetermined electrodes of said multi-electrode tube for developing oscillations of a predetermined frequency, means for intensity modulating the developed oscillations under the control of the developed signal voltage, means for rectifying the intensity modulated oscillations, and means for biasing the thermionic amplifying means under the control of the rectified modulated energy.

ROSCOE H. GEORGE.